(12) United States Patent
O'Driscoll et al.

(10) Patent No.: US 7,538,527 B2
(45) Date of Patent: May 26, 2009

(54) CURRENT-FED MULTIPLE-OUTPUT POWER CONVERTER

(75) Inventors: Seamus O'Driscoll, Cloyne (IE); Plotr Markowski, Worcester, MA (US)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 12/191,054

(22) Filed: Aug. 13, 2008

(65) Prior Publication Data

US 2009/0015218 A1  Jan. 15, 2009

Related U.S. Application Data

(62) Division of application No. 11/359,055, filed on Feb. 22, 2006.

(60) Provisional application No. 60/654,992, filed on Feb. 22, 2005.

(51) Int. Cl.
*G05F 1/577* (2006.01)
*G05F 1/00* (2006.01)
(52) U.S. Cl. ...................... 323/267; 323/222
(58) Field of Classification Search ............... 323/222, 323/225, 267, 268, 271, 282, 350, 351
See application file for complete search history.

(56) References Cited

U.S. PATENT DOCUMENTS

| 4,847,742 | A | | 7/1989 | Ohashi et al. | |
| 5,886,508 | A | * | 3/1999 | Jutras | 323/267 |
| 6,222,352 | B1 | | 4/2001 | Lenk | |
| 6,355,990 | B1 | | 3/2002 | Mitchell | |
| 6,437,545 | B2 | * | 8/2002 | Sluijs | 323/222 |
| 6,522,110 | B1 | | 2/2003 | Ivanov | |

(Continued)

OTHER PUBLICATIONS

Chakraborty, Sombuddha et al., "A Novel Power Distribution System Using a Central Buck-Based Current Source for Multiple Individually Regulated Outputs," Department of Electrical and Computer Engineering, University of Minnesota, IEEE, 2003, pp. 1379-1383.

*Primary Examiner*—Matthew V Nguyen
(74) *Attorney, Agent, or Firm*—K&L Gates LLP

(57) ABSTRACT

A power converter is disclosed. According to one embodiment, the power converter includes a first stage including a current source for generating a current signal, and a second stage. The second stage includes n output circuits coupled to the current source for converting the current signal into n corresponding output voltages. Each of the n output circuits includes an output switch responsive to a corresponding $n^{th}$ control signal for regulating the corresponding $n^{th}$ output voltage. The second stage further includes a controller for generating the n control signals. The controller includes, for each of the n output circuits, an error amplifier, a waveform generator, and a summing circuit. Each error amplifier generates an output signal based upon a comparison of the output voltage of the $n^{th}$ output circuit and a corresponding $n^{th}$ reference voltage. Each waveform generator generates a waveform signal. The waveform signals for the n output circuits are characterized by a common amplitude and period, and the phases of the waveforms signals are spaced at predetermined intervals. The summing circuit sums the output of the error amplifier and the waveform signal to generate an amplitude-shifted waveform signal. The controller further includes a comparator circuit for outputting the n control signals to the output switches based upon a comparison of the relative amplitudes of the amplitude-shifted waveform signals.

17 Claims, 9 Drawing Sheets

U.S. PATENT DOCUMENTS

| | | |
|---|---|---|
| 6,636,022 B2 | 10/2003 | Sluijs |
| 6,900,620 B2 * | 5/2005 | Nishimori et al. ............ 323/222 |
| 6,919,713 B2 * | 7/2005 | Hoshino et al. ............. 323/267 |
| 7,176,661 B2 * | 2/2007 | Kranz ........................ 323/222 |
| 7,256,568 B2 * | 8/2007 | Lam et al. .................... 323/222 |
| 7,378,823 B2 * | 5/2008 | Yamanaka et al. .......... 323/267 |
| 2006/0198165 A1 | 9/2006 | O'Driscoll et al. |

* cited by examiner

US 7,538,527 B2

CURRENT-FED MULTIPLE-OUTPUT POWER CONVERTER

CROSS REFERENCE TO RELATED APPLICATIONS

This application is a divisional application of co-pending U.S. patent application Ser. No. 11/359,055 filed Feb. 22, 2006, which claims the benefit under 35 U.S.C. § 119(e) to U.S. Provisional Patent Application Ser. No. 60/654,992, filed Feb. 22, 2005, which is incorporated herein by reference.

BACKGROUND

The number of voltages required in a typical communications or server application is rising and seems to average more than five. Furthermore, the required voltage levels are dropping and need to be independently and tightly regulated. There are presently two broad approaches. First, there is the ac "front-end" or dc "bus converter" combined with separate non-isolated "point of load" (or "niPOL") regulators, usually synchronous buck converters, for each output voltage. The latter part of this approach is often termed the "Intermediate Bus Architecture." Second, there is the Isolated Converter Module approach that has multiple magnetically coupled outputs, some of which may be post regulated. For both of these approaches the component count is high, with multiple magnetic windings or cores, and usually two isolated pieces of power switch silicon per output. Furthermore, there is the technical obstacle, that, as voltages migrate lower, it is increasingly difficult to employ magnetic coupling alone, as the most cost sensitive applications have relied upon to date. Accordingly, there exists a need for a power conversion approach that generates multiple independently regulated output voltages using a single magnetic and only one switch per additional output.

Several methods of multiple output, single inductor switch-mode topologies have been proposed to address this problem. Practical implementation of these methods, however, is faced with significant difficulties due to complex control methods and bi-directional blocking capability required by the power switches.

SUMMARY

The present invention is directed generally and in various embodiments to a power converter. According to one embodiment, the power converter includes a first stage including a current source for generating a current signal, and a second stage. The second stage includes n output circuits coupled to the current source for converting the current signal into n corresponding output voltages. Each of the n output circuits includes an output switch responsive to a corresponding $n^{th}$ control signal for regulating the corresponding $n^{th}$ output voltage. The second stage further includes a controller for generating the n control signals. The controller includes, for each of the n output circuits, an error amplifier, a waveform generator, and a summing circuit. Each error amplifier generates an output signal based upon a comparison of the output voltage of the $n^{th}$ output circuit and a corresponding $n^{th}$ reference voltage. Each waveform generator generates a waveform signal. The waveform signals for the n output circuits are characterized by a common amplitude and period, and the phases of the waveforms signals are spaced at predetermined intervals. The summing circuit sums the output of the error amplifier and the waveform signal to generate an amplitude-shifted waveform signal. The controller further includes a comparator circuit for outputting the n control signals to the output switches based upon a comparison of the relative amplitudes of the amplitude-shifted waveform signals.

FIGURES

Various embodiments of the present invention are described herein by way of example in conjunction with FIGS. 1-12 of this application, wherein.

DETAILED DESCRIPTION

Figure 1:
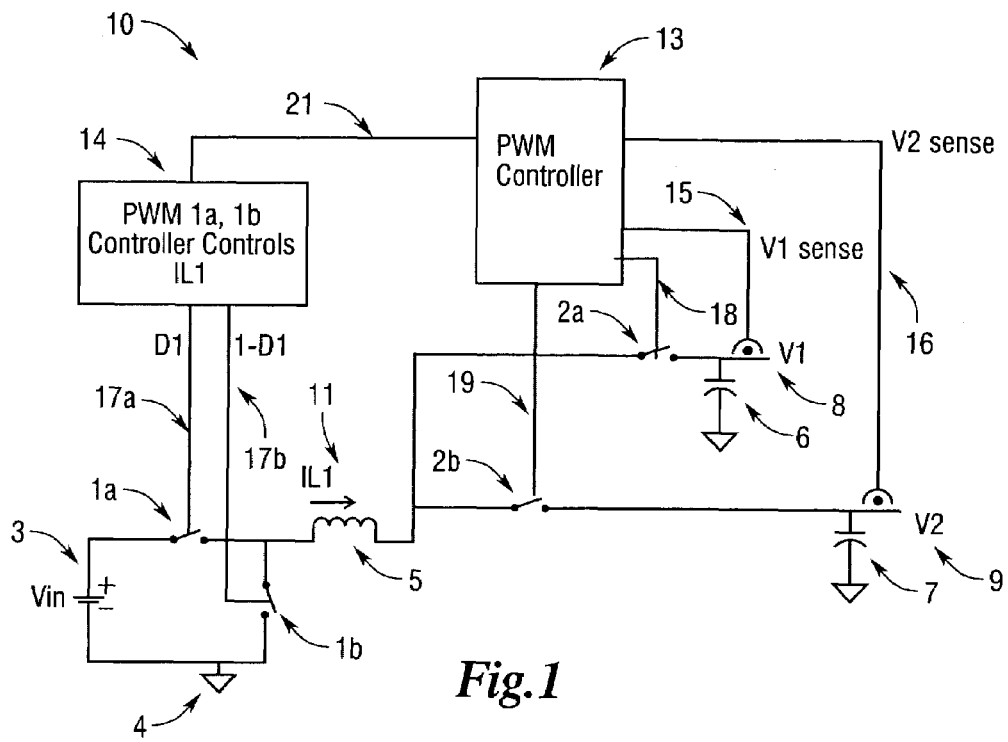
FIG. 1 is a schematic diagram of a power converter according to various embodiments of the present invention.

FIG. 1 is a schematic diagram of a power converter 10 according to various embodiments of the present invention. The power converter 10 includes a first stage, referred to hereinafter as the front-end stage, comprising switches 1a, 1b, an inductor 5, and a PWM controller 14. The power converter further includes switched-capacitor output circuits, comprising output switches 2a, 2b and corresponding output capacitors 6, 7, coupled to the front-end stage. The front-end stage operates as a controlled current source for establishing a current flow 11 through the inductor 5 in accordance with a control law based on the total energy requirements of the output circuits. According to various embodiments and as shown in FIG. 1, a buck converter configuration may be used to implement the front-end stage, although it will be appreciated that other converter topologies suitable for configuration as a controlled current source may alternatively be used.

The power converter 10 employs a current-fed topology whereby each output circuit time-slices the inductor current flow 11 for generating corresponding output voltages $V_1$ 8 and $V_2$ 9. Although two output circuits are shown in FIG. 1, it will be appreciated that any number of output circuits may be provided depending upon the number of output voltages required by a particular application. The output switches 2a, 2b may be operated in sequence at duty cycles determined by a PWM controller 13 in accordance with one of two controls methods, as discussed below. The output circuits and the PWM controller 13 collectively form the second stage of the power converter 10, referred to hereinafter as the output stage. For essentially all times during the switching period (depicted as "T" in FIG. 2), at least one of the output switches 2a, 2b is preferably closed to maintain a path for the current flow 11. Advantageously, embodiments of the present invention enable the generation of PWM signals for controlling the output switches 2a, 2b in accordance with this requirement while maintaining high quality regulation of the output voltages.

The PWM controller 14 controls switches 1a, 1b of the front-end stage to establish the appropriate level of current flow 11 through the inductor 5. According to various embodiments, the control scheme implemented by the PWM controller 14 may utilize feedback information relating to the duty cycle (i.e., the pulse width) of each of its outputs. Additionally or alternatively, the PWM controller 14 may utilize intermediate or output signals of the output stage PWM controller 13, as well as other signals (e.g., sensed current flow 11, sensed input voltage $V_{in}$ supplied to the front-end stage, etc.), as is generally known in the art.

Figure 2:
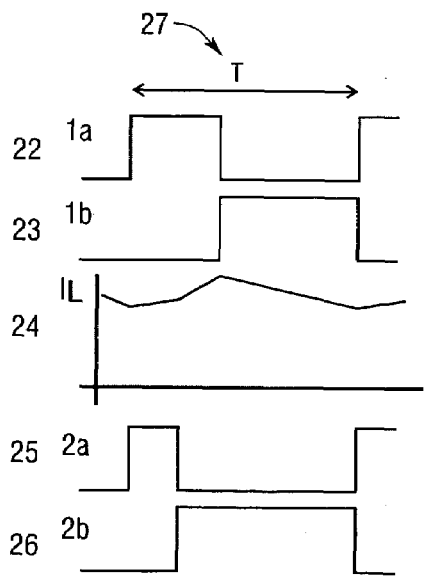
FIG. 2 illustrates idealized current and voltage waveforms present in the power converter of FIG. 1 during its operation.

FIG. 2 illustrates idealized current and voltage waveforms present in the power converter 10 during its operation. Voltage waveforms 22, 23 represent the PWM gate drive signals of switches 1a,b, respectively, for enabling the operation of the front-end stage as a switch-mode controlled current source, as is generally known in the art. In accordance with a control law embedded in PWM controller 14, the duty cycle of each waveform 22,23 is regulated to maintain the current flow 11 substantially equal to the sum of the currents required by the output circuits. Current waveform 24 represents the resulting current flow 11 through the inductor 5. Voltage waveforms 25, 26 represent the PWM gate drive signals of the output switches 2a,2b, respectively. As discussed below, the duty cycle of each waveform 25, 26 is controlled such that the output switches 2a, 2b time slice the current flow 11 to maintain the desired amplitudes of the corresponding output voltages $V_1$ 8 and $V_2$ 9. Although the front-end stage voltage waveforms 22, 23 and the output stage voltage waveforms 25, 26 are depicted in FIG. 2 as being synchronized and as having a common period T 27, it will be appreciated that synchronization is not necessary and that each set of waveforms may be characterized by a different period.

In embodiments in which the front-end stage is implemented using a buck converter configuration, as shown in FIG. 1, the output voltages will in general be lower than the input voltage $V_{in}$ to satisfy volt-second balance conditions of the inductor 5. It will be appreciated that one or more (but not all) of the output voltages may be higher than $V_{in}$, however, so long as the average volt-second balance is maintained.

The following three equations describe the steady state operation of the output circuits. The output current of a particular output circuit is determined by the product of its corresponding switch duty cycle (D) times the intermediate bus current (i.e., the inductor current flow 11). Equations (1) and (2) are not modified by efficiency as they would be in a voltage-fed system and are valid excepting for leakage currents to ground.

$$I_{Ox} = D_x \times I_{L1} \quad (1)$$

$$I_{L1} = \sum_{x=1}^{n} I_{Ox} \quad (2)$$

-continued $$V_{Oavg} = \sum_{x=1}^{n} D_x \times V_{Ox} \quad (3)$$

The output current and the input current (choke current) are denoted by $I_O$ and $I_{L1}$, respectively. The particular output is denoted by "x", and "n" denotes the total number of outputs. For the case of variable frequency, D is treated as the instantaneous duty cycle.

Subject to the average output voltage (as given by equation (3)) being less than the input voltage $V_{in}$, an individual output voltage may be higher than $V_{in}$, even for embodiments in which the front-end stage is implemented using a buck converter configuration. It will be appreciated that capacitors 6, 7 may be arranged as described in U.S. Pat. No. 6,636,022, which is incorporated herein by reference, to create negative output voltages.

Figure 3:
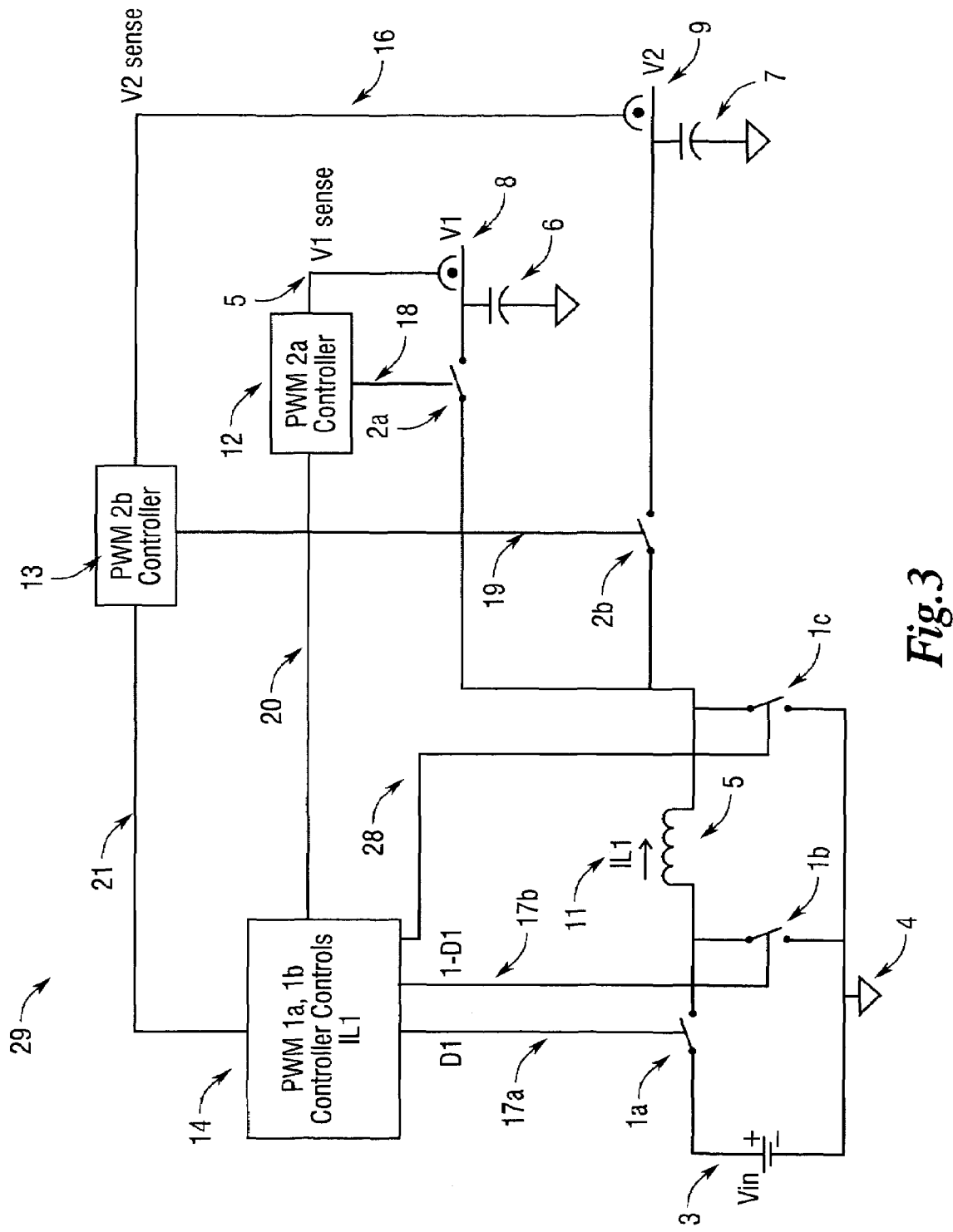
FIG. 3 is a schematic diagram of a power converter according to various embodiments of the present invention.

FIG. 3 is a schematic diagram of a power converter 29 that implements a boost converter configuration such that all of the output voltages may be higher than the input voltage $V_{in}$ according to various embodiments of the present invention. One or more (but not all) of the output voltages may be lower than $V_{in}$, however, so long as the average volt-second balance is maintained. It is also possible to use switch 1c only during output switch transitions to keep the voltage from rising if none of the output switches 2a, 2b is sufficiently conductive during transition. Alternatively, it may be possible to use switch 1c for rapid current dump during abrupt load transients.

Figure 4:
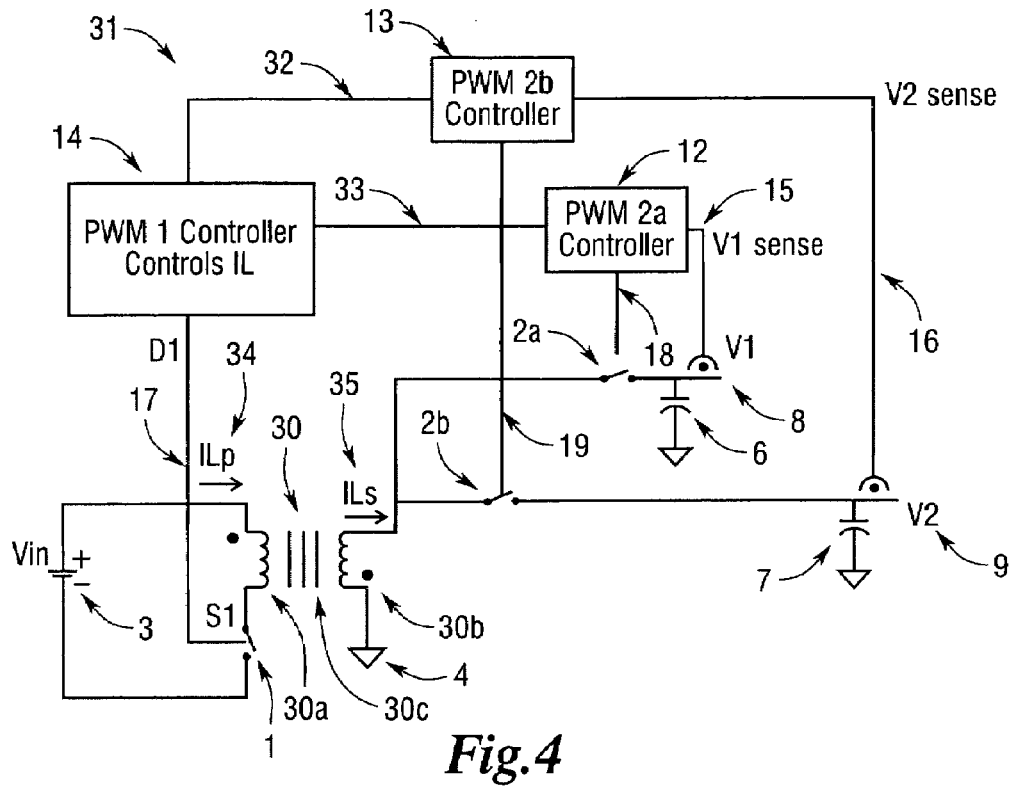
FIG. 4 is a schematic diagram of a power converter according to various embodiments of the present invention.
Figure 5:
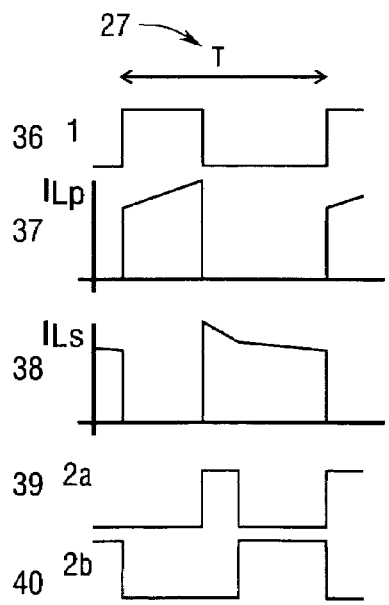
FIG. 5 illustrates idealized current and voltage waveforms present in the power converter of FIG. 4 during its operation.

FIG. 4 is a schematic diagram of an isolated power converter 31 comprising a flyback front-end stage according to various embodiments of the present invention. FIG. 5 illustrates idealized current and voltage waveforms present in the power converter 31 during its operation. The magnetic device 30 may be regarded as a coupled inductor that operates in a manner similar to the inductor 5 of the non-isolated topologies described above. The output switches 2a, 2b of the output stage are switched in sequence during the flyback interval to release stored energy to their respective outputs. The output switches 2a, 2b are off while the switch 1 of the front-end stage is turned on to store energy in the coupled magnetic device 30. Connections 32, 33 convey galvanically-isolated duty cycle information or other output stage state information from the output PWM controllers 12, 13 to the PWM controller 14 of the front-end stage.

Figure 6:
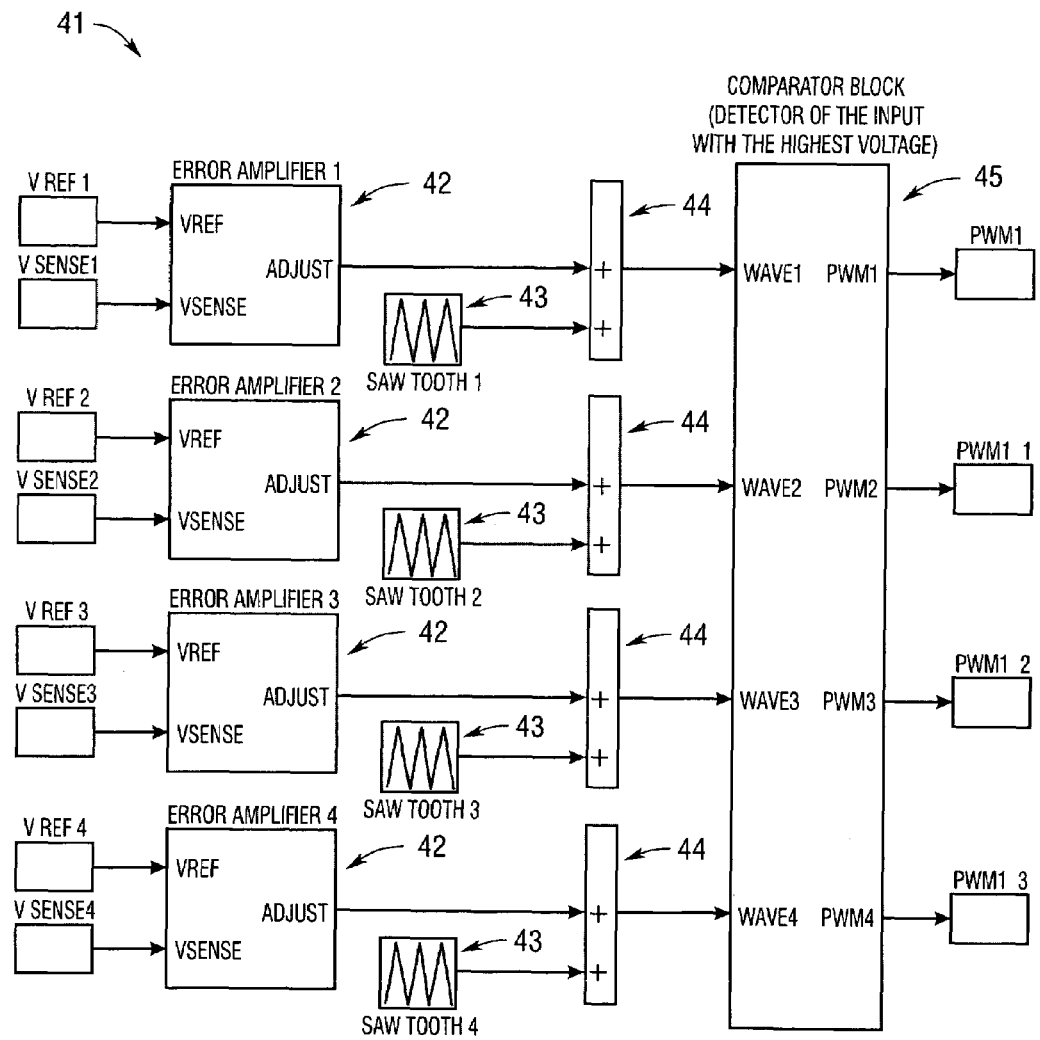
FIG. 6 is a block diagram of a control circuit and corresponding control method according to various embodiments of the present invention.

Fixed Frequency Multiple PWM Generation: FIG. 6 is a block diagram 41 of a control circuit and corresponding control method utilized by the PWM controllers 12,13 for implementing a four-output realization according to various embodiments of the present invention. Advantageously, an independent control loop for regulating each output voltage is employed. This arrangement enables the fast and precise regulation of each output voltage necessary for modern applications. As shown in FIG. 6, the control circuit may comprise, for each output circuit, an error amplifier 42, a signal generator 43, and a summing circuit 44. The control circuit may further comprise a comparator 45. Each error amplifier 42 receives as input a reference voltage representing the desired voltage to be output by the corresponding output circuit, along with a sensed value of the corresponding output voltage. The output of each error amplifier 42 may be amplified and dynamically compensated and represent a difference between the reference and sensed voltages input thereto. The output of each error amplifier 42, along with a voltage waveform output by the corresponding signal generator 43, is input into the corresponding summing circuit 44. The output of each summing circuit 44 represents the supposition of the error amplifier 42 and signal generator 43 outputs and is then input to the comparator 45. As discussed below, outputs of the comparator 45 indicate which comparator 45 input has the largest amplitude and function as the PWM gate drive signals for the output switches.

To understand the operation of the control circuit of FIG. 6, it is instructive to first consider its open-loop operation, that is, operation with all error amplifier 42 outputs fixed at constant level (e.g., zero volts). As shown, the outputs of the signal generators 43 may be triangular waveforms of equal amplitude and frequency and arranged in a phase-shifted configuration such that the waveforms are separated by 360/n degree increments, where n is the number of outputs circuits. For the four-output realization of FIG. 6, for example, the triangular waveforms may have phases of 90, 180, 270, and 360 degrees, respectively. It will be appreciated, however, that a different phase spacing (e.g., an irregular phase spacing) may provide acceptable results and, in some cases, be particularly advantageous. Similarly, it will be appreciated that the triangular shape of the waveforms output by the signal generators 43 is provided by way of example only and that other waveform shapes may be used in other embodiments. These and similar modifications are intended to be encompassed within the scope of the present invention. During open-loop operation, the outputs of the summing circuits 44 are replicas of their respective signal generator 43 inputs. Accordingly, the triangular waveforms are input into the comparator 45 and a determination of which triangular waveform having the highest amplitude at any given time is performed. Based upon the results of this determination, the comparator 45 outputs a PWM gate drive signal to the output switch associated with the comparator 45 input having the largest amplitude. Accordingly, the current flow 11 is time-sliced and selectively distributed to the output circuits based upon the relative amplitudes of the comparator 45 inputs. Thus, for open-loop operation, the total available period is equally divided between all output circuits such that the amount of charge provided to each is equal. For the four-output realization of FIG. 6, the "on-time" of each output circuit will be equal to ¼ of the total period of the triangular waveforms.

Figure 8:
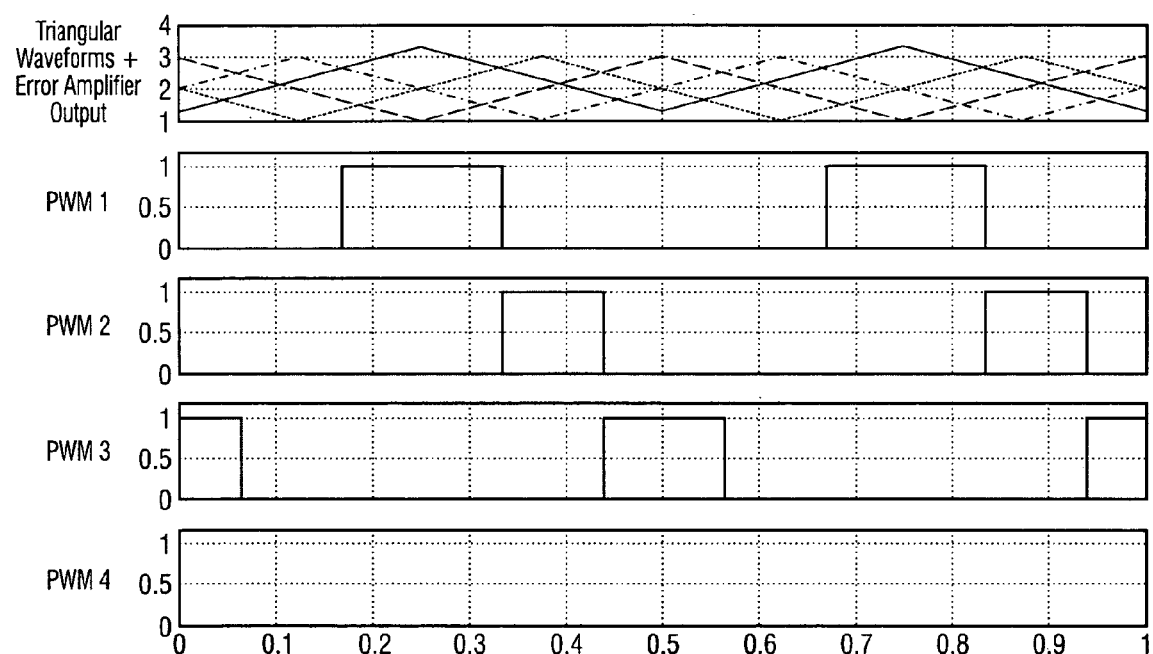
FIG. 8 illustrates voltage waveforms present in control circuit of FIG. 6 during its operation.

Closed-loop operation of the error amplifiers 42 is now considered for various embodiments of the present invention. In this case, a naturally occurring imbalance between the charge flowing into and out of the capacitors of the output circuits results in voltage regulation errors. These errors are amplified and dynamically compensated by the corresponding error amplifiers 42. The output of each error amplifier 42 is then summed, via the corresponding summing circuit 43, with the triangular waveform output of the corresponding signal generator 43. The error amplifier 42 may be configured such that when the sensed voltage is less than the reference voltage, the addition of its output to the corresponding triangular waveform results in a triangular waveform having an upwardly-shifted amplitude. Conversely, configuration of the error amplifier 42 may be such that when the sensed voltage is more than the reference voltage, addition of its output to the corresponding triangular waveform results in a triangular waveform having an downwardly-shifted amplitude. An upwardly-shifted triangular waveform has an expanded share of the total on-time at the expense of the directly preceding and following un-shifted triangular waveforms. A downwardly-shifted triangular waveform has a reduced share of the total on-time with respect to the directly preceding and following un-shifted triangular waveforms. This principle of operation can be understood with reference to FIG. 8. In FIG. 8, the triangular waveform associated with the first output circuit is shifted upward as a result of its error amplifier working to increase its corresponding output voltage (unchanged load is assumed). At the same time, the other triangular waveforms remain unchanged (consistent with error amplifiers 42 at neutral level, neither attempting to increase nor decrease their respective output voltages). As a result, the on-time for the first output circuit is increased by a time x above ¼ of the total period, while the two adjacent output circuits (i.e., those output circuits associated with the triangular waveforms at +90 degrees and −90 degrees with respect to the shifted triangular waveform) are each reduced by a time x/2 below ¼ of the total switching period. The on-time of the output circuit associated with the remaining triangular waveform remains unchanged at ¼ of the total switching period (¼ is a fraction of the overall period consistent with the "neutral" stance of the particular error amplifier). Simultaneous interplay of all feedback loops assures that the output voltages remain in regulation, except for short transients. PWM control signals for regulating multiple output voltages generated in this fashion may further be used to implement aspects of the front-end stage PWM controller 14. For example, the output signals of all individual error amplifiers 42 may be used to generate the command signal for the duty cycle of the front-end PWM controller 14. In one embodiment, the command signal may be generated simply by summing the respective outputs of all error amplifiers 42. In another embodiment, signals representing the regulation errors of all output voltages may be used. These signals may be combined with other signals representing other states (e.g., input voltage $V_{in}$, input current, load currents, etc.), dynamically compensated, and then employed in a feedforward and/or feedback arrangement. Various non-linear and time varying (e.g., adaptive) control methods may also be used, as is generally known in the art.

Figure 7:
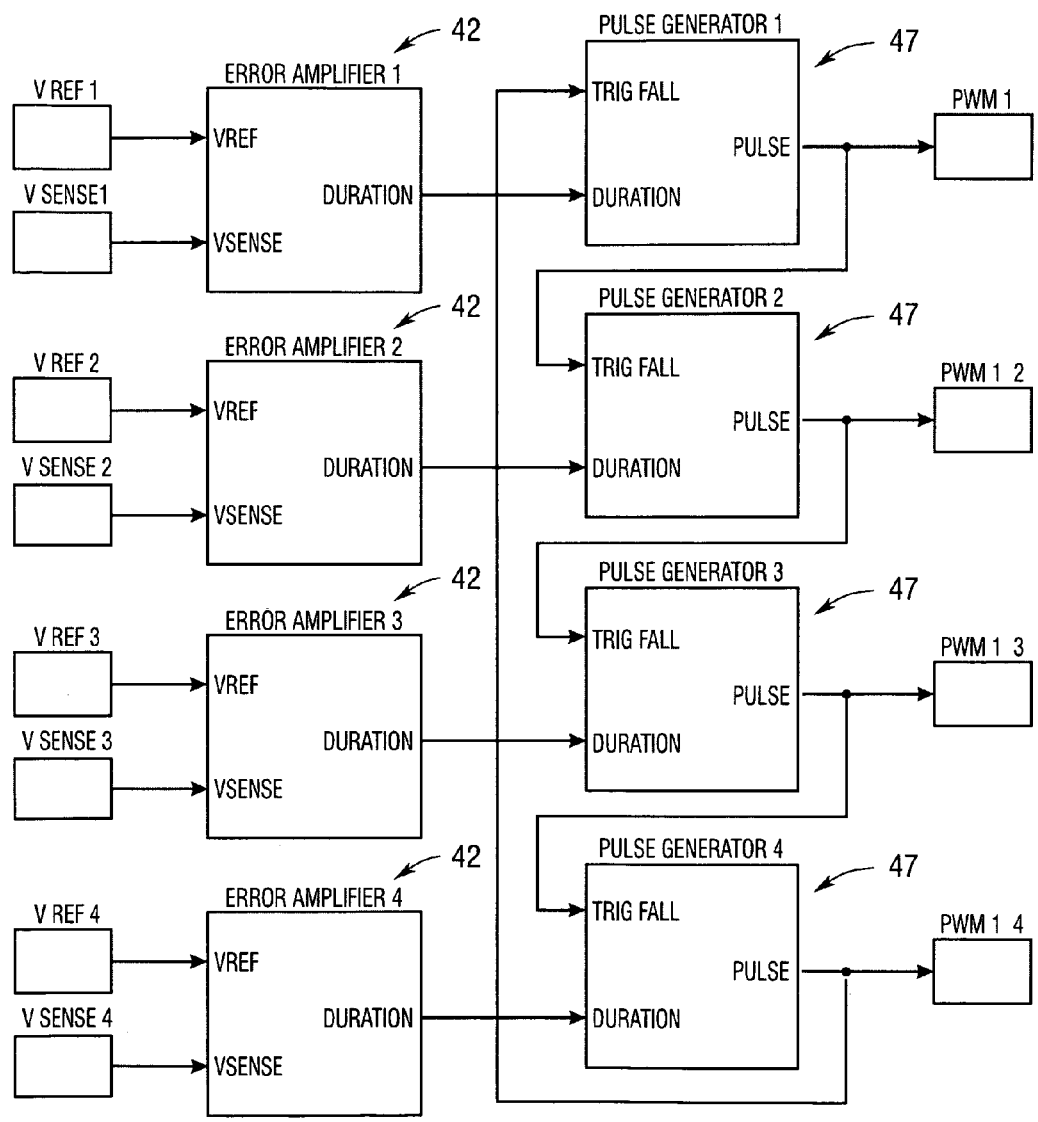
FIG. 7 is a block diagram of a control circuit and corresponding control method according to various embodiments of the present invention.

It will be appreciated that advantages of the above-described control scheme include the following:
  fixed frequency operation for all outputs and simplified implementation of the front-end stage
  sharing of cross regulation effects (dynamic burden) across multiple outputs.
  simple architecture Sum Pulse Width Controller: FIG. 7 is a block diagram 46 of another control circuit and corresponding control method that may be implemented by the PWM controllers 12,13 for multiple output topologies according to various embodiments of the present invention. Although the control circuit as shown is configured for a four-output realization, it will be appreciated that the control circuit may be adapted to supply more or fewer voltage outputs. The control circuit may comprise, for each output circuit, an error amplifier 42 and a pulse generator 47. Each error amplifier 42 receives as input a reference voltage representing the desired voltage to be output by the output circuit, along with the sensed value of the corresponding output voltage. The output of each error amplifier 42 may be amplified and dynamically compensated and represent a difference between the reference and sensed voltage values input thereto. The output of each error amplifier 42 is input into the corresponding pulse generator 47. Each pulse generator 47 may be configured to output a voltage pulse responsive to a falling edge of a signal input thereto. The pulse output of each pulse generator 47 serves as the PWM gate drive signal for the output switch of the corresponding output circuit. As discussed below, the duration of the voltage pulse output by a particular pulse generator 47 may be determined based upon a pre-determined pulse duration of the pulse generator 47 and an adjustment thereto determined by the output received from the corresponding error amplifier 42.

It is instructive to first consider the open-loop operation of the control circuit with the output of each error amplifier 42 fixed at neutral level (e.g., when the sensed voltages are equal to their corresponding reference voltages). In this case, each pulse generator 47, when triggered by its corresponding falling edge input, produces an output pulse of a corresponding pre-determined duration. Because the pulse generators 47 are interconnected in a wrap-around fashion wherein the falling edge of a pulse generator 47 output serves as the falling edge input for triggering a subsequent pulse generator 47, each output circuit is serviced by the front-end current source for ¼ of the total period (assuming all error amplifiers command the same pre-determined pulse duration).

During closed-loop regulation, each error amplifier 42 responds to an imbalance in its sensed voltage by adjusting the pre-determined duration of the pulse output of the corresponding signal generator 47 and, thus, the on-time of the corresponding output circuit. Consider the case where a particular error amplifier 42 increases the duration (pulse width) demand. This is equivalent to commanding an increased portion of the overall available charge to the corresponding output circuit at the expense of the other output circuits. Thus, the effective instantaneous "duty cycles" of the other output circuits are decreased due to the expanded duration of the sum of all output pulses constituting a full period. The other output error amplifiers 42 must compensate for these decreases by adjusting the duration of the pulse outputs for their respective pulse generators 47. The resulting pulse train for driving the output switches is thus characterized by dynamically varying frequency dictated by the rate of change of the load(s) fed by the output voltages. The interaction of all the error amplifiers 42 results in the outputs voltages being well regulated.

Figure 9:
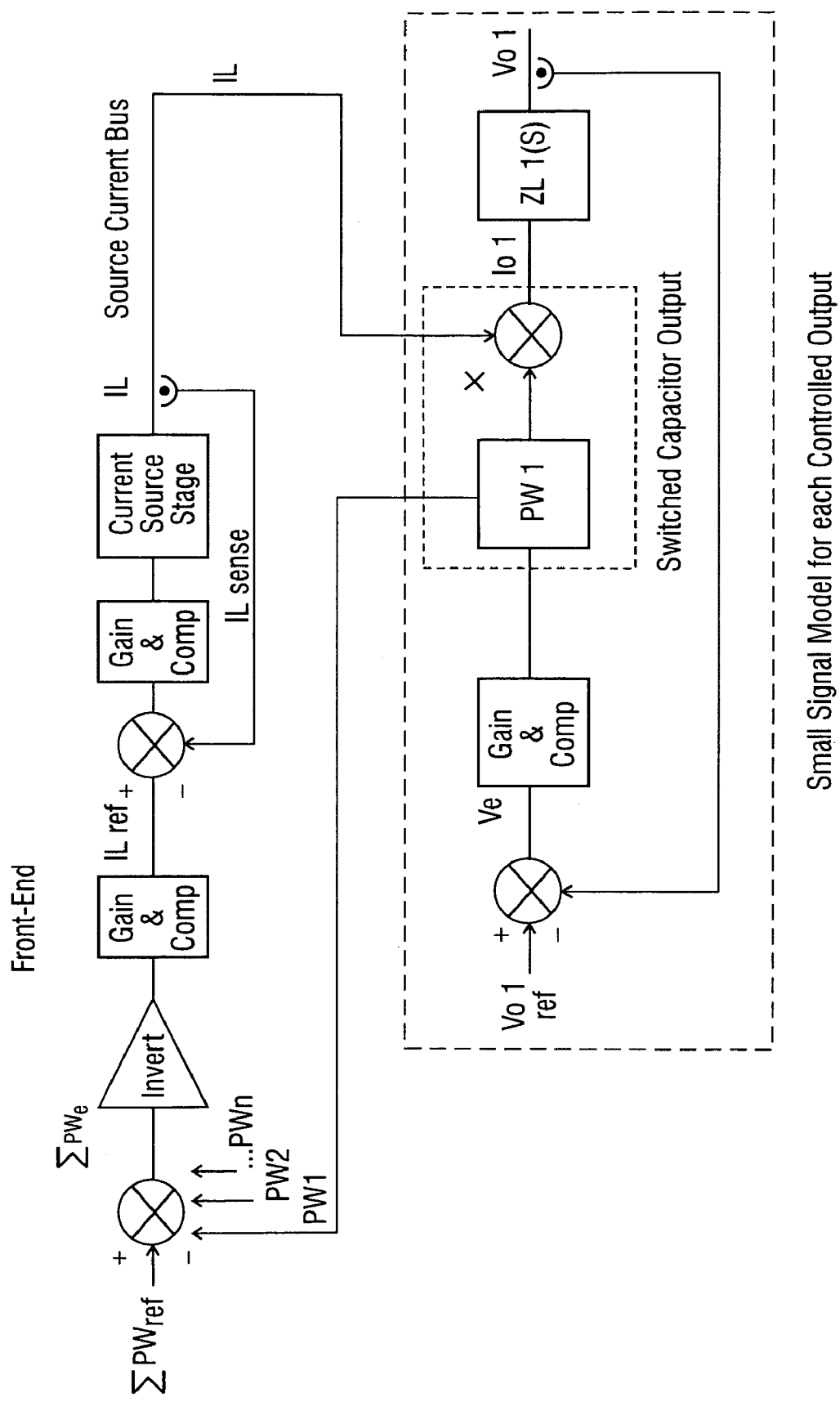
FIG. 9 is a schematic diagram of closed-loop control configuration according to various embodiments of the present invention.

A closed loop regulator configuration may be employed wherein the sum of the durations of the pulse generator 47 outputs are compared with a desired operating period to adjust the total supply current available from the front-end stage using a pulse-width summing (ΣPW) compensator, as shown in FIG. 9. For embodiments of the present invention in which the ΣPW compensator is implemented using an integrator, as shown in FIG. 9, the system will converge to a desired steady state operating frequency. Where the ΣPW compensator is configured to implement other control schemes, such as, for example, a proportional control scheme, the steady state frequency may vary depending on the static load. It will be appreciated that other parameters of the system may be employed to influence the steady state or dynamic frequency characteristics as desired for the particular ΣPW compensator implementation.

Figure 10:
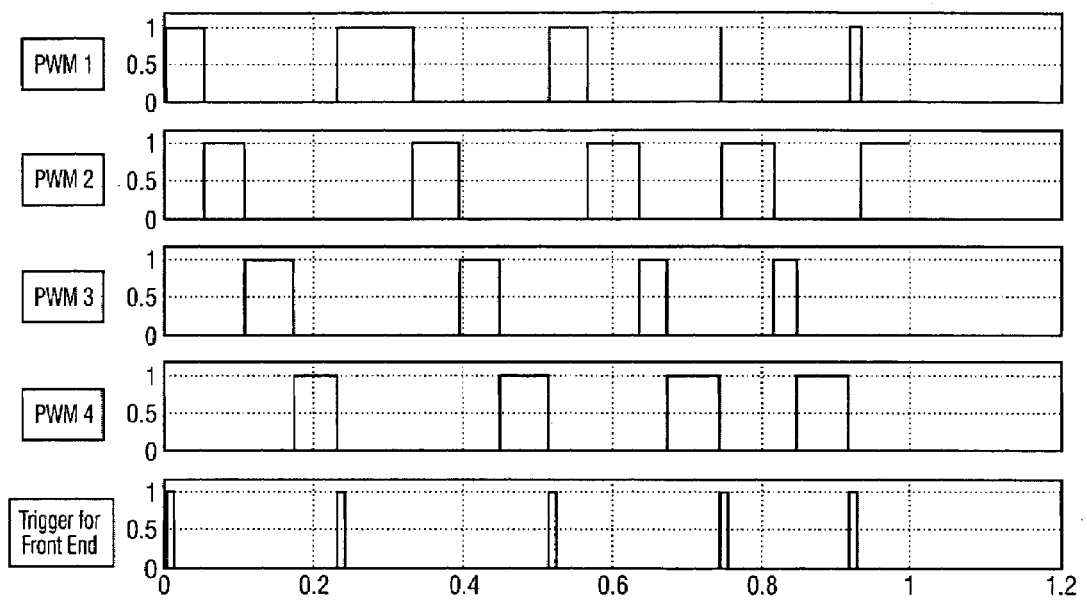
FIG. 10 illustrates voltage waveforms present in the control circuit of FIG. 7 during its operation.

FIG. 10 illustrates voltage waveforms present in the power converter of FIG. 7 during its operation. Trigger points are created at the rising edge of the first pulse and the trailing edge of the last pulse for use if it is desired to synchronize the front-end PWM controller 14 with the output stage PWM controllers 12, 13. It is not necessary, however that the front end PWM controller 14 be synchronized in this manner or even operated at the same switching frequency as the output stage PWM controllers 12, 13.

Those skilled in the ordinary art will recognize that various methods may be employed for constructing the error amplifiers 42 and selecting their compensation characteristics. Although the above-described embodiments employ feedback of the output voltages, it will be appreciated that other signals may also be used. Without limitation, such signals may include output currents and input voltage $V_{in}$, as is generally known in the art. These states may also be employed in a feedforward arrangement. Additionally, signals representing states of other outputs can be used to derive the pulse width for a particular output circuit in order to optimize dynamic or cross-regulation characteristics. Still further, compensation may include use of various components, such as, for example, integral, proportional, and derivative components, either alone or in various combinations. Non-linear and time-varying (e.g., adaptive) control methods may also be used, as is generally known in the art.

It will be appreciated that advantages of the above-described control scheme include the following:

suitable adjustment of the frequency of operation for the output circuits and simplified implementation of the front-end stage reduction of cross regulation effects (dynamic burden) across multiple output circuits simple architecture It will be appreciated that depending on the objectives for a particular power converter application, one of the above-described control methods may be more optimal than the other. Nonetheless, either control method may be employed for the regulation of multiple output power converters of the type described herein.

J-FET Implementation, Four-Terminal Vertical Power MOSFET Implementation, and CMOS Implementation: The output switches of embodiments of the present invention, such as the output switches 2a, 2b in the topology of FIG. 1, may differ from typical non-isolated topologies, insofar as they are preferably capable of blocking voltage bi-directionally when in the off-state (i.e., when the gate voltage is low). This is necessary to prevent an output circuit operating at a higher voltage from discharging to an output circuit operating at a lower voltage during power transfer to the latter. Bi-directional voltage blocking has been previously implemented with MOSFETs and series blocking diodes, but at the expense of efficiency. Series blocking diodes are used due to the inherent body diode of the conventional power MOSFET. A dual-output format with a variety of N and P channel MOSFET or diode combinations is described in U.S. Pat. No. 6,222,352, but such arrangements have the restriction that any particular output voltage must always remain higher or lower than another. Three output switch solutions, the first based on J-FETs, the second based on four-terminal (4-T) MOSFETs, and the third based on CMOS switches, enable a very simple and flexible architecture that allows any output to be controlled to a higher or lower voltage than any other output. These solutions essentially employ "off-state" reverse blocking switches in each output, thus eliminating the requirement for series blocking devices.

According to various embodiments, JFET switches lacking body diodes, particularly Vertical Power Trench J-FETs, may be used to implement each of the output switches 2a, 2b in the topology of FIG. 1.

Figure 11:
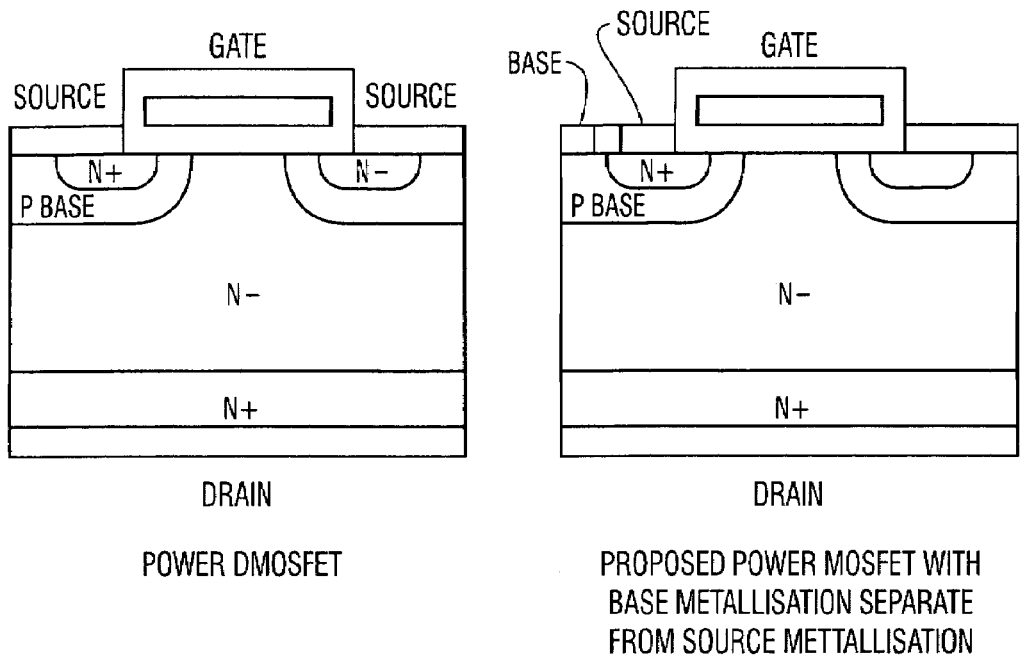
FIG. 11 is a schematic diagram of a four-terminal MOSFET switch according to various embodiments of the present invention.

FIG. 11 illustrates an N-Channel Vertical Power D-MOSFET with the source-to-body (base) region short circuit metallisation removed, thus providing a four-terminal MOSFET device that may be used in embodiments of the present invention. Although the discussion herein relates to N-channel devices in particular, it will be appreciated that P-channel devices may also be employed. The modification of FIG. 11 may be applied to the many variations of the Vertical Power MOSFET (e.g., the U-MOSFET) to render them suitable for use with embodiments of the present invention as discussed below.

Figure 12:
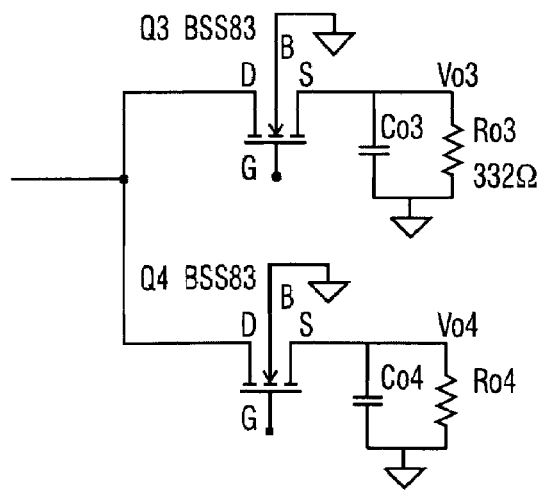
FIG. 12 is a schematic diagram of a power converter utilizing four-terminal MOSFETs switches according to various embodiments of the present invention.

According to various embodiments, 4T-MOSFETs formed in accordance with FIG. 11 may utilize a four-terminal connection within a power converter topology. FIG. 12 illustrates an example of how the 4-T MOSFETs may be employed to create the output stages of a dual-output converter. Although the body region is shown tied to ground, it will be appreciated that the body region may instead be tied to any voltage equal to or lower (for N-channel devices) than the output voltages. The P-N junction existing between the body region and the drain region does not enable conduction of any substantial current, as would otherwise occur when the source voltage is higher than the drain voltage and where conduction is allowed between body and source regions, via either their P-N junction or the short-circuit metallisation. The body-source and the body-drain P-N junctions are held off or in reverse bias by maintaining the body voltage equal to or lower than any output voltage. This prevents any substantial conduction between any output voltage and the body voltage supply. An output circuit operating at a higher output voltage is thus prevented from discharging through its corresponding off-state output switch to a output circuit operating at a lower voltage when the output switch of the latter is in the on-state. It should be noted that as the source-to-body voltage (VSB) is increased there is an effective decrease in the RDS value (on) for the device. However, where the gate drive voltage is significantly higher than the output voltages, this is not a significant drawback. As VSB is increased, the surface depletion charge increases and hence the total surface charge required for inversion is increased to give an effective reduction in the inversion charge that is required for majority carrier conduction. Therefore, it may sometimes be appropriate to set the body region at a voltage that is equal to or only a little lower than the lowest output voltage. The 4-T MOSFET of FIG. 11 is effectively a "body-diode-less" device because the traditional body diode that exists between drain and source in a Vertical Power MOSFET is now split into two series and opposite facing P-N junctions.

In addition to the use of MOSFET, J-FET, and 4-T MOSFET switching devices, embodiments of the present invention may also utilize CMOS, NMOS or PMOS switching devices for use in any topology that implements a time-slicing scheme for distributing the front-end current between multiple output circuits.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A power converter comprising:
   a first stage comprising a current source for generating a current signal; and
   a second stage comprising:
   n output circuits coupled to the current source for converting the current signal into n corresponding output voltages, wherein each of the n output circuits comprises an output switch responsive to a corresponding $n^{th}$ control signal for regulating the corresponding $n^{th}$ output voltage; and
   a controller for generating the n control signals comprising:
   for each of the n output circuits:
   an error amplifier configured to generate an output signal based upon a comparison of the output voltage of the $n^{th}$ output circuit and a corresponding $n^{th}$ reference voltage;
   a waveform generator for generating a waveform signal, wherein the waveform signals for the n output circuits are characterized by a common amplitude and period, and wherein the phases of the waveforms signals are spaced at predetermined intervals; and
   a summing circuit for summing the output of the error amplifier and the waveform signal to generate an amplitude-shifted waveform signal; and
   a comparator circuit for outputting the n control signals to the output switches based upon a comparison of the relative amplitudes of the amplitude-shifted waveform signals.

2. The power converter of claim 1, wherein current source comprises a single magnetic device.

3. The power converter of claim 2, wherein the current source comprises a buck converter.

4. The power converter of claim 2, wherein the current source comprises a boost converter.

5. The power converter of claim 2, wherein current source is isolated from the second stage and comprises a flyback converter.

6. The power converter of claim 1, wherein n is a number greater than 1.

7. The power converter of claim 1, wherein the waveform signal generated by each waveform generator is a triangular waveform signal.

8. The power converter of claim 1, wherein the phases of the waveforms are equally spaced, and wherein the predetermined intervals are equal to 360/n degrees.

9. The power converter of claim 1, wherein the comparator is configured to output a control signal to the output switch of the control circuit corresponding to the amplitude-shifted waveform signal having the largest amplitude.

10. The power converter of claim 1, wherein the control signals generated by the controller for controlling the output switches of the n output circuits are characterized by a fixed-frequency switching cycle.

11. The power converter of claim 2, wherein the current source is a controlled switch-mode current source.

12. The power converter of claim 11, wherein the current source comprises a controller and at least two switches for controlling a magnitude of the current signal, wherein the switches are responsive to corresponding control signals generated by the controller.

13. The power converter of claim 12, wherein the controller of the first stage generates the control signals based at least in part upon a sum of the outputs of the error amplifiers corresponding to each of the n output circuits.

14. The power converter of claim 1, wherein at least one of the output switches is a switch selected from the group consisting of: a 3-terminal MOSFET switch, a 4-terminal MOSFET switch, a J-FET switch, and a CMOS switch.

15. The power converter of claim 1, wherein at least one output switch comprises an N-Channel Power MOSFET having a gate terminal, a source terminal, a drain terminal, and a body terminal, wherein the body terminal is coupled to a voltage that is no greater than the lowest of the n output voltages.

16. The power converter of claim 15, wherein the MOSFET comprises a short circuit metallization layer, and wherein the short circuit metallization layer comprises the source terminal and the base terminal.

17. A method for regulating n voltage outputs of a current-fed power converter, wherein each voltage output is generated by a corresponding switched output circuit, comprising:

for each of the n voltage outputs:

generating an error signal based upon a comparison of the $n^{th}$ voltage output and a corresponding $n^{th}$ reference voltage;

generating a waveform signal, wherein the waveform signals for the n output circuits are characterized by a common amplitude and period, and wherein the phases of the waveforms signals are spaced at predetermined intervals; and summing the error signal and the waveform signal to create a corresponding amplitude-shifted waveform signal; and performing a comparison of the amplitude-shifted waveform signals corresponding to each of the n voltage outputs to determine which has the largest amplitude; and outputting a control signal to the output circuit corresponding to the determined amplitude-shifted waveform signal, wherein the output circuit comprises a switch for regulating the corresponding voltage output responsive to the control signal.

* * * * *

UNITED STATES PATENT AND TRADEMARK OFFICE
CERTIFICATE OF CORRECTION

PATENT NO. : 7,538,527 B2  Page 1 of 1
APPLICATION NO. : 12/191054
DATED : May 26, 2009
INVENTOR(S) : O'Driscoll et al.

It is certified that error appears in the above-identified patent and that said Letters Patent is hereby corrected as shown below:

On title page Item (75) Inventor: delete "Plotr Markowski" and replace therewith --Piotr Markowski--.

Signed and Sealed this

Nineteenth Day of January, 2010

David J. Kappos
*Director of the United States Patent and Trademark Office*